E. J. VON PEIN.
CASH REGISTER.
APPLICATION FILED NOV. 15, 1913.

1,198,492.

Patented Sept. 19, 1916.
8 SHEETS—SHEET 1.

FIG.1.

Witnesses
H. F. Sadgebury
E. D. Given

Inventor
Edward J. Von Pein
by R. C. Glass
Chester H. Braselton
Attorneys

E. J. VON PEIN.
CASH REGISTER.
APPLICATION FILED NOV. 15, 1913.

1,198,492.

Patented Sept. 19, 1916.
8 SHEETS—SHEET 3.

E. J. VON PEIN.
CASH REGISTER.
APPLICATION FILED NOV. 15, 1913.

1,198,492.

Patented Sept. 19, 1916.
8 SHEETS—SHEET 4.

Witnesses
V. F. Sadgebury
E. R. Given

Inventor
Edward J. Von Pein
by R. C. Isears
Chester H. Braselton
Attorneys

E. J. VON PEIN.
CASH REGISTER.
APPLICATION FILED NOV. 15, 1913.

1,198,492.

Patented Sept. 19, 1916.
8 SHEETS—SHEET 6.

FIG. 9.

Witnesses
H. F. Sadgrbury
E. R. Given

Inventor
Edward J. Von Pein
by R. C. Glass
Chester H. Brockton
Attorneys

E. J. VON PEIN.
CASH REGISTER.
APPLICATION FILED NOV. 15, 1913.

1,198,492.

Patented Sept. 19, 1916.
8 SHEETS—SHEET 8.

Witnesses
H. F. Sadgebury
Ed Sivern

Inventor
Edward J. Von Pein
by R. C. Glass
Chester H. Brunelton
Attorneys

UNITED STATES PATENT OFFICE.

EDWARD J. VON PEIN, OF DAYTON, OHIO, ASSIGNOR TO THE NATIONAL CASH REGISTER COMPANY, OF DAYTON, OHIO, A CORPORATION OF OHIO, (INCORPORATED IN 1906.)

CASH-REGISTER.

1,198,492. Specification of Letters Patent. Patented Sept. 19, 1916.

Application filed November 15, 1913. Serial No. 801,293.

*To all whom it may concern:*

Be it known that I, EDWARD J. VON PEIN, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers or accounting machines, and has particular reference to improvements in the printing mechanism of such machines.

Ticket issuing machines adapted to certain lines of business are so constructed that the tickets issued by them have printed thereon at two different places characters designating, for example, the consecutive number, date, amount and nature of the transaction for which the ticket is issued, with a perforated line between the two printings to permit tearing the tickets in two. In previous constructions the perforator is usually carried by a rotatable element having an invariable movement and the perforator teeth are so arranged that all are brought into play at the same instant. This causes the machine to run hard at that particular point of the operation.

One object of the present invention is to provide a perforator so arranged that the teeth, while they are carried by an invariably moved rotatable element and perforate in a straight line at right angles to the length of the ticket strip, are not brought into play simultaneously, but one after the other, thereby distributing the perforating operation over a greater part of the operation of the machine and making the machine run more easily.

Another object of the invention is to provide improved means for holding the paper against or opposing it to the teeth of the perforator. In previous constructions a roller of rubber or similar yielding material was used, into which the teeth of the perforator sank after they passed through the paper. Such rollers are necessarily short lived and therefore unsatisfactory, a condition which the applicant remedies by using an improved roller made of steel or other durable material and arranged to accomplish the same result as the rubber roller.

Another object of the invention is to provide improved paper feeding mechanism arranged to either eject the tickets after they have been printed and severed from a continuous strip of paper carried by the printer or feed a slip inserted to receive impressions from the type carriers comprised by the printing mechanism. In the present embodiment, the printer makes two impressions on either the ticket or the inserted slip. Independent actuating devices for the feeding elements are provided, one actuating the feeding elements to feed the slip so as to space it between the printing of the items and the other actuating the feeding elements merely to eject the ticket from the machine after the printing thereof has been completed. This actuator controlling mechanism is shown herein as controlled by the keys through which the transactions are classified in the various record retaining devices of the machine. It will be apparent, however, that this construction is not essential, and that the actuators can just as well be controlled by separate manipulative devices having no other function.

With these and incidental objects in view, the invention consists of certain novel features of construction and combination of parts, the essential elements of which are set forth in appended claims, and a preferred form of embodiment of which is hereinafter described.

With reference to the drawings which accompany and form part of the specification.

Figure 1:
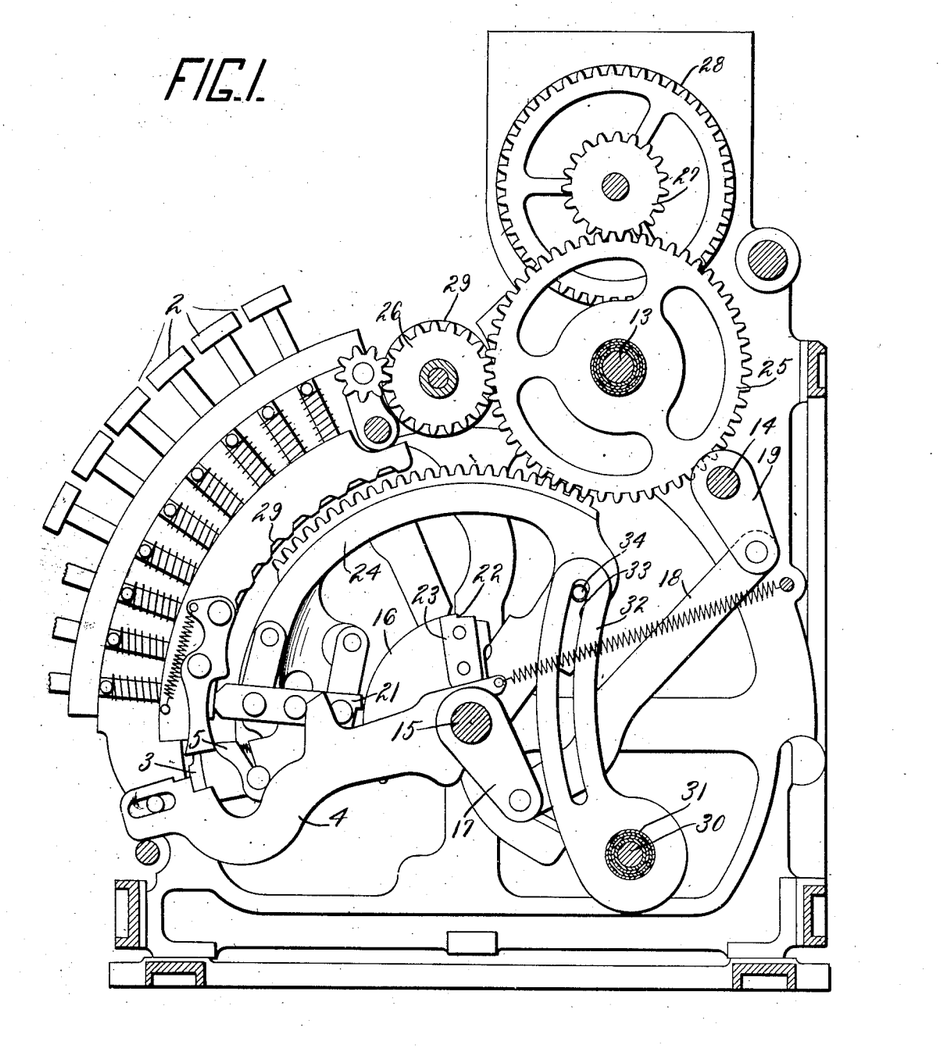
—Figure 1 is a vertical section showing the main operating mechanism of the illustrative machine.

The machine in the drawings is of the general type shown and described in United States Letters Patent 580,378, granted April 13, 1897, to J. P. Cleal and F. A. Reinhard, and 754,049 granted March 8, 1904, to Thomas Carroll. In said patents and this application, there is shown a register of the two-motion type, that is, one in which entries are made by first depressing the proper keys on the key board and then turning the operating handle. Such a machine has a plurality of banks or sections, one of which is shown in Fig. 1. Each of these sections has a vertical row of depressible keys 2, which are held in their depressed positions until near the end of the operation by a detent 3 and retaining bar 4, with one end of the depressed key projecting into the path of a trip 5.

Figures 4, 5:
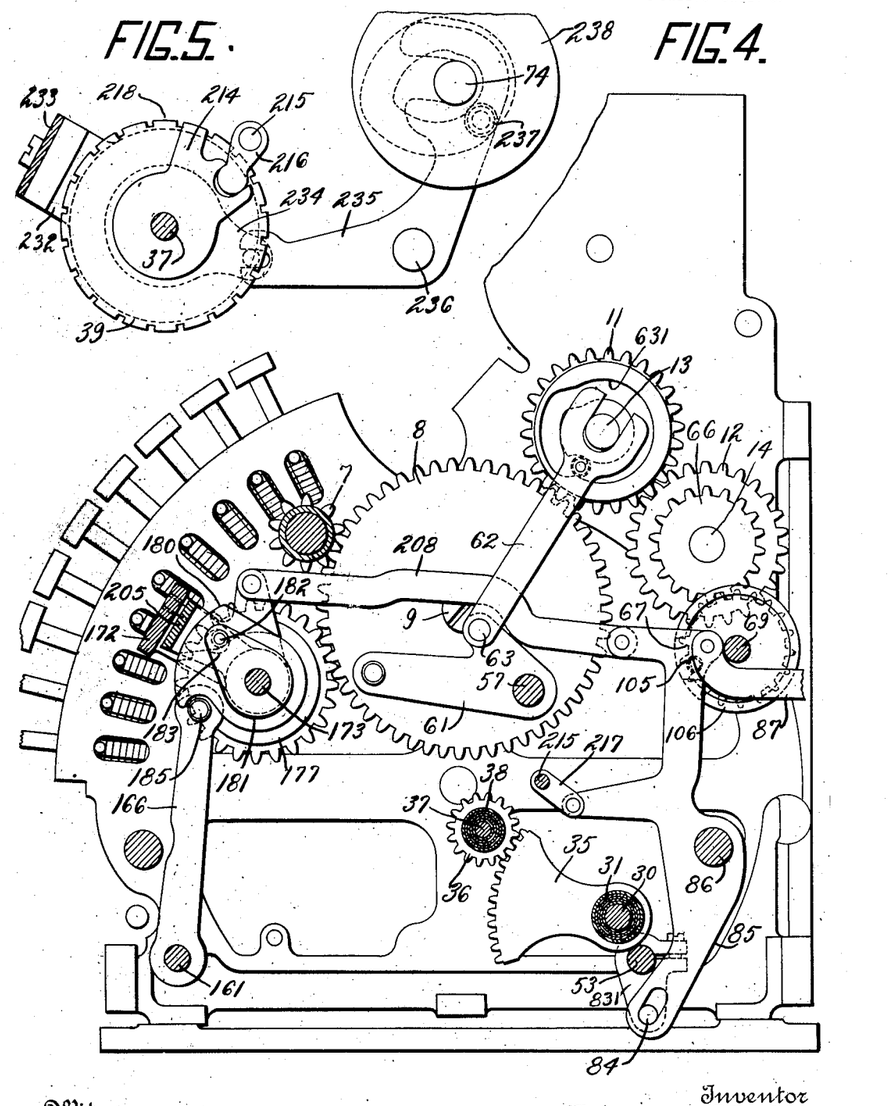
Fig. 4 shows certain features of the printer operating and controlling mechanism.
Fig. 5 is a detail of mechanism for positioning a type carrier to print a character on the record strip when the ticket printer is disabled and the printing done on an inserted slip.
Figure 8:
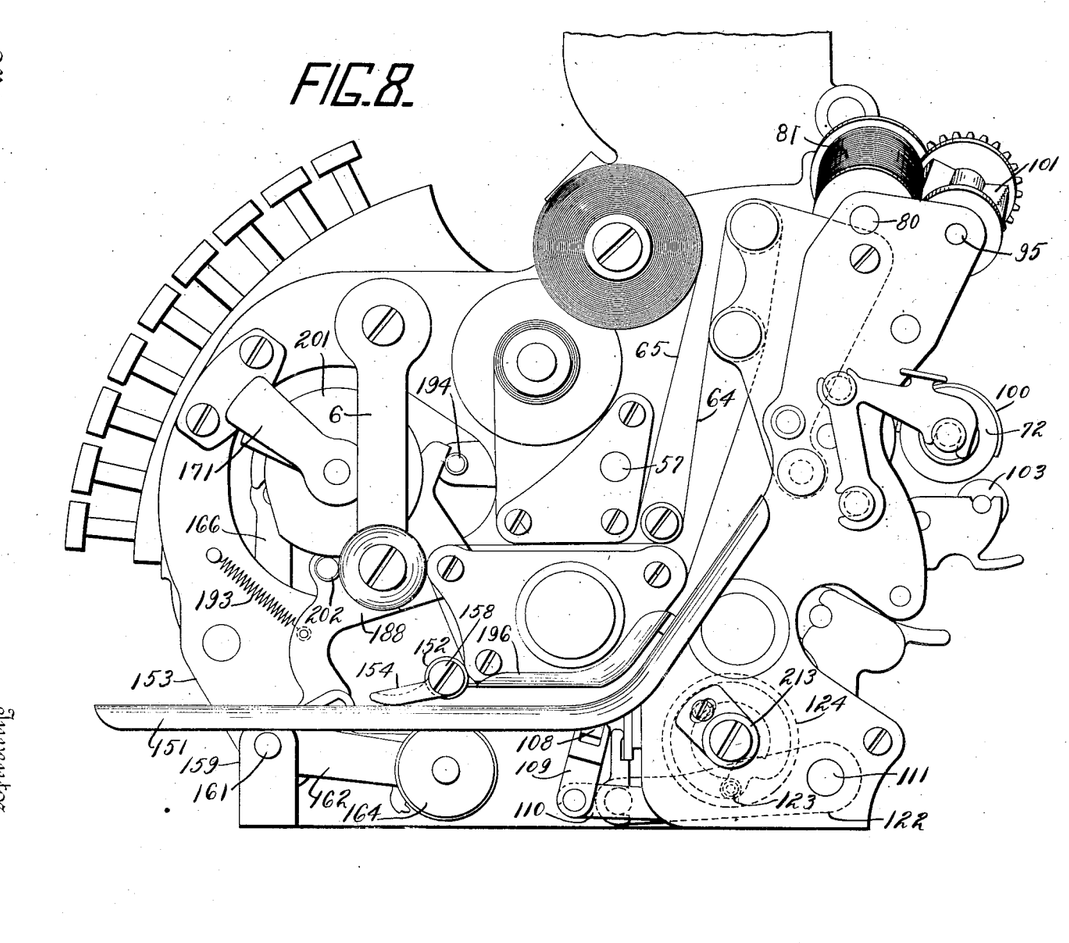
Fig. 8 is a right side elevation of the printer with the improvements assembled in position.
Figure 9:
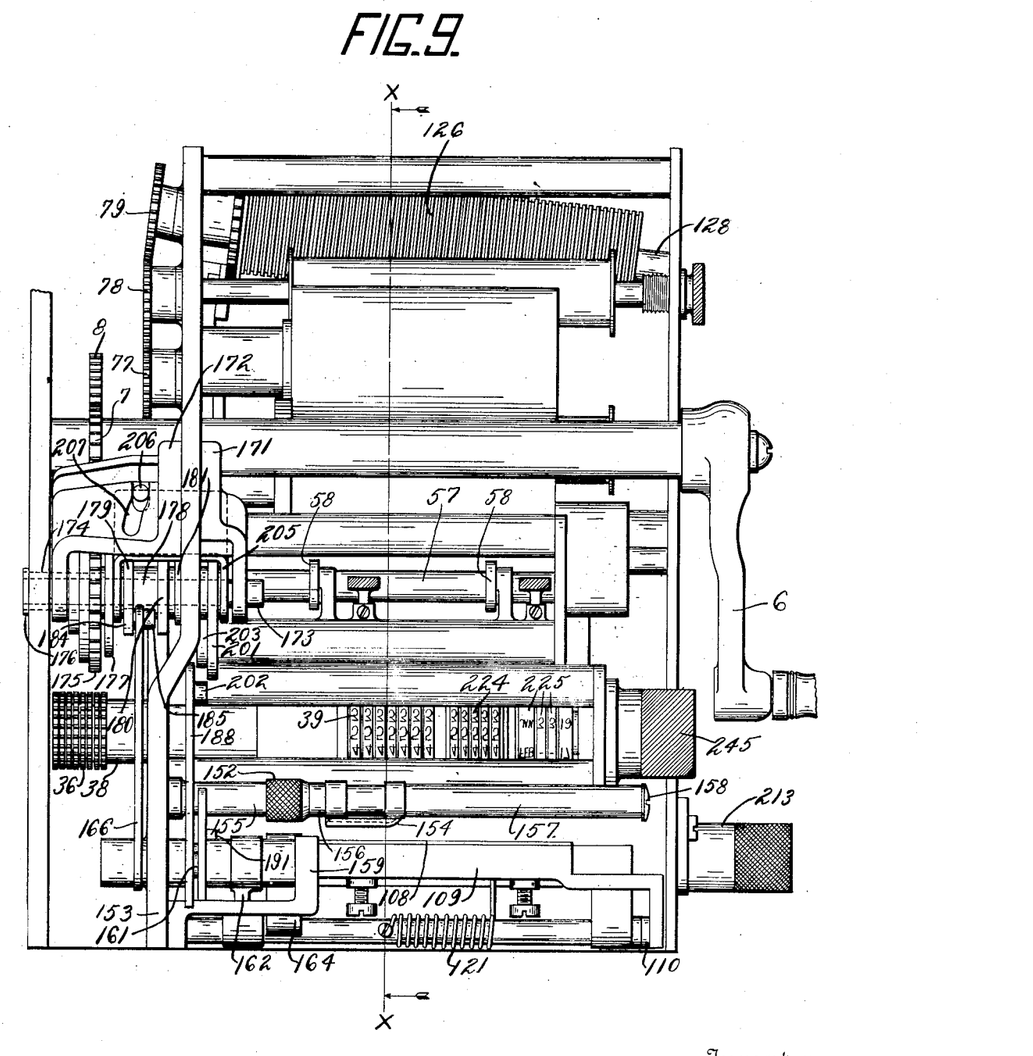
Fig. 9 is a front elevation of the printer shown in Fig. 8.

The operating handle 6, Figs. 8 and 9, has connected thereto a pinion 7, Fig. 4, meshing with a large intermediate gear 8, rotatably mounted on a stub shaft 9 in the machine frame. This intermediate gear drives gears 11 and 12 rigidly attached to shafts 13 and 14 respectively extending through the machine. This gearing is so proportioned that for every two complete rotations of the operating handle the shafts 13 and 14 are given one complete rotation. As will be developed more fully later, nearly all of the devices of the machine are operated from these two shafts.

Running transversely through the machine frames is a rock shaft 15 (Fig. 1) secured to which is a plate 16 for each bank or section. Attached to this rock shaft is an arm 17 which is connected by a link 18 to an arm 19 fastened to the driving shaft 14. When the shaft 14 makes a rotation the arm 19 is, of course, carried with it and as the arm 19 is shorter than the arm 17, the rotation of the former only oscillates the arm 17 and the rock shaft 15 through an arc of about 90 degrees, first anti-clockwise and then clockwise. During the anti-clockwise movement a plunger 21 carried by a segment 24 is moved into engagement with a lug 22 on a plate 23 attached to the plate 16, and, through this connection, carries the segment 24 upward during the clockwise movement of the plate until the trip 5 which is operatively connected to the plunger strikes the end of the depressed key and causes the plunger 21 to be disengaged from the lug 22, thereby disconnecting the segment 24 from the plate 16. As the plunger is disengaged from the lug 22 it is projected into one of the notches 29 corresponding to the key used, holding the segment 24 in its moved position. The segment 24 is in mesh at all times with an intermediate gear 25, which in turn meshes with an operating gear 26 for the totalizer 29 and a pinion 27 rigid with an indicator 28. Through this series of connections the differential movement of the segment 24 is transmitted to the totalizer and indicating devices so as to add and indicate the value represented by the key depressed.

Figures 6, 7:
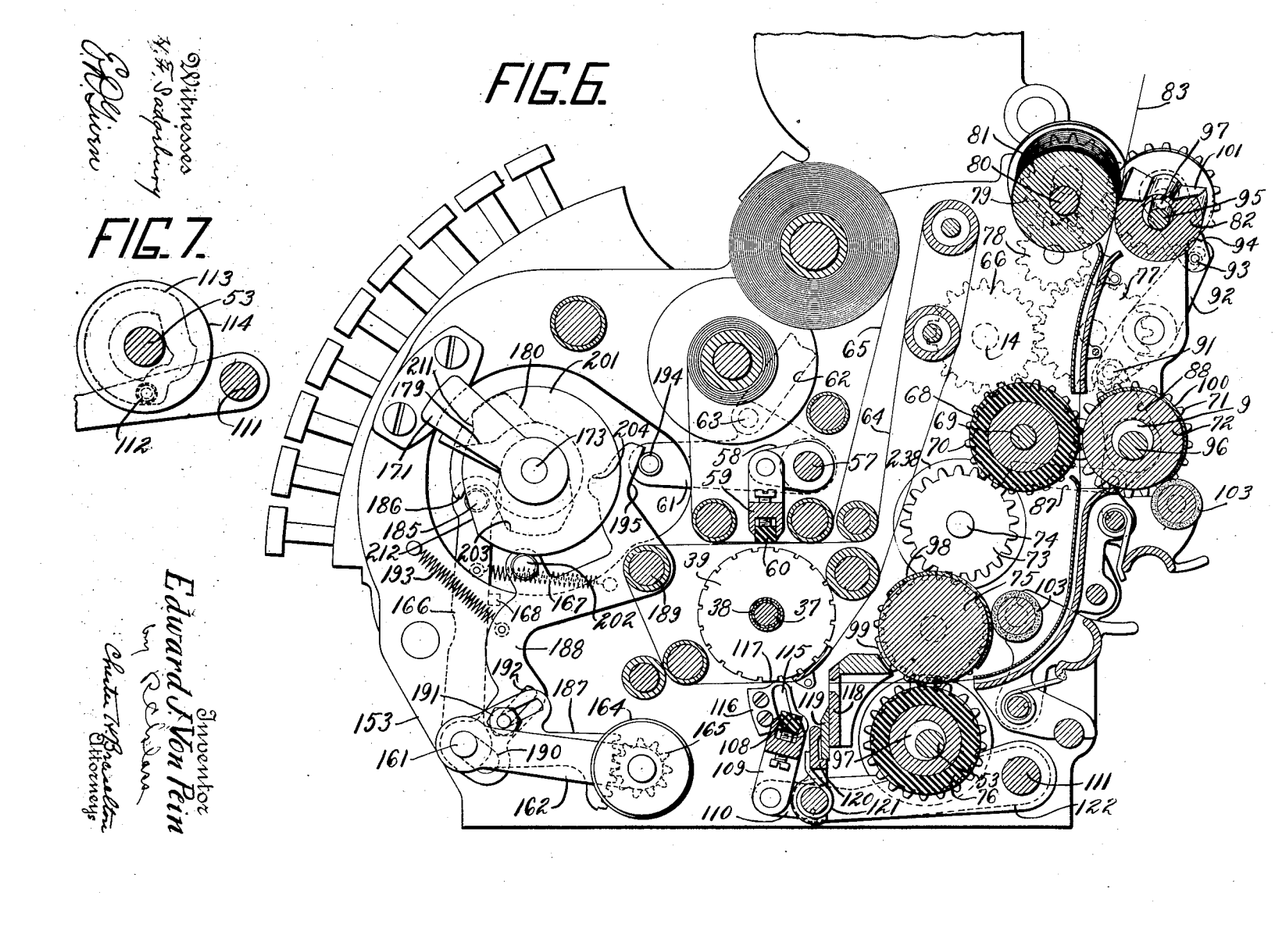
Fig. 6 is a section through the printing mechanism taken on the line X—X Fig. 9.
Fig. 7 is a detail of the platen operating arm and cam.

Extending across the machine is a shaft 30 and a series of nested sleeves 31. For this shaft and each of the sleeves, and rigidly attached thereto, there is provided an arm 32 having a curved slot 33 engaging a stud 34 fastened to the segment 24. Through this connection any movement of the segment 24 is transmitted to either the shaft 30 or the proper sleeve 31. At their right ends, the shaft and sleeves each carry a segment 35, Fig. 4, the teeth of which mesh with pinions 36, attached to a short shaft 37 and concentric sleeves 38, to the other ends of which are attached the value printing wheels 39 (Fig. 6). The slots 33 are so graduated that movement of a segment 24 will, through the intervening mechanism just described, rotate the corresponding type wheel 39 to bring to printing position a figure or character to represent the key depressed in that particular bank or section of the machine. The three lower keys of the left-hand bank, that is, keys 41, 42 and 43 (Fig. 2) are used for special transactions, such as "received on account," "charge" and "paid out." They operate the same as the keys 2 and are retained in depressed position in the same way by a detent and retaining bar. Each of these keys carries a pin 45 extending laterally across the end of a plate 46 slidably supported at its front end by a pin 47 in the machine frame and at the rear end by an open slot in the plate partially surrounding the rock shaft 15. A pitman 48 is also slidably supported at its forward end by the rock shaft 15 and carries a stud 51 projecting through a slot 50 in the plate 46. The rear end of this pitman is pivotally attached to an arm 52 fastened to a shaft 53 extending through the machine frames. When one of the special keys 41, 42 or 43 is depressed, its pin 45 will contact the forward end of the plate 46 and carry it rearwardly against the tension of a spring 49 until the key reaches the end of its stroke and is latched in its depressed position. This rearward movement of the plate 46 brings the forward end of the slot 50 in contact with the pin 51 and moves an anti-friction roller 54 carried by the plate into the path of the camming edge 55 of an element 56 secured to the rock shaft 15. When the machine is operated this element 56 is immediately carried down and the camming edge 55, acting against the roller 54, will draw the plate 46 still farther in a rearwardly direction. As the forward edge of the slot 50 in the plate 46 is at this time in contact with the stud 51, the pitman 48 is forced back and, through the arm 52, rocks the shaft 53. This rocking movement of the shaft 53 controls the ticket printing mechanism and paper feeding devices in a manner to be described fully later on.

The assembled printer is shown in Figs. 8 and 9. It is constructed to print a record of all transactions upon a continuous record strip and normally issues a ticket having printed thereon, at two different places, data regarding each transaction for which a ticket is issued. The ticket is perforated between these printings to allow it to be readily torn into two parts. On certain transactions, such as "received on account" "charge" and "paid out," such a ticket may not answer all of the requirements, as it is usually necessary to itemize the articles involved in such transactions and this can be done to better advantage on a slip of the proper arrangement which can be inserted in the printer to receive the impressions that are normally made on the ticket. The slip can be of any form, such as a main part and a stub, each receiving one of the impressions; or an original with a duplicate extending beyond the margin of the original so that one of the printings will come on the original and the other on the duplicate. On a slip printing transaction the ticket printing mechanism is automatically disabled.

In addition to the usual ticket feeding devices a feeding mechanism is provided which operates on the ticket issuing transactions to simply eject the ticket after all the printing has been done thereon, or, when a transaction is entered requiring the use of an inserted slip, the devices for driving this feeding mechanism are automatically shifted so as to bring other devices comprised by the driving mechanism into play to feed the inserted slip the proper distance between the two printings before mentioned.

The positioning of the type carriers for printing the amounts, has already been described. In addition to the amount type carriers there are provided type carriers for printing the consecutive number, the date and a character to indicate when a slip is issued. All of the type carriers, with the exception of the two latter, carry two sets of figures on their peripheries, one to print on a continuous record strip and the other to print on either the ticket or the inserted slip. The date is printed on the ticket or slip, but not on the record strip while the slip character is printed on the record strip only. The strip printer comprises a platen and operating mechanism therefor, as well as the usual strip feeding devices and mechanism for feeding and reversing the feed of the ink ribbon. Only the platen and its operating mechanism need be described here, as the other devices can be of almost any of the many well known forms of such devices.

Attached to a short shaft 57 (Figs. 4, 6 and 9) is a pair of arms 58 to which is pivoted a frame 59 arranged to hold a strip 60 of rubber or other satisfactory material. Fastened to the same shaft is a bell crank lever 61. A pitman 62, pivoted at 63 to the bell crank and forked at its upper end to span the driving shaft 13, carries an anti-friction roll projecting into a cam groove 63¹ cut in the side of the gear 11. As the gear 11 makes a complete rotation every time the machine is operated, the shaft 57 will be rocked first anti-clockwise and then clockwise, and the rubber 60 carried down so as to press the ink ribbon 64 and the record strip 65 against the type carriers, thereby taking an impression on the strip from the type, after which the parts are returned to normal position. The cam groove 63¹ is so timed that the platen 60 is not operated until just before the end of the operation of the machine.

The ticket issuing and printing mechanism proper is driven from the shaft 14. A gear 66 attached to said shaft meshes with the teeth of a gear 67 (Fig. 4), carried by a shaft 69 to which an impression roll 68 is also secured. A gear 70 (Fig. 6) rigid with the impression roll 68 meshes with a gear 71 rigid with the electrocylinder 72, also a gear 73 rotating on a stub shaft 74 in the printer frame. This gear 73 in turn drives the electroroll 75 and the impression roll 76 through suitable gears fastened to said rolls. The gear 66 is also in engagement at all times with a gear 77 meshing with a pinion 78 rotating on stub shafts in the printer frame and driving a gear 79 carried by the shaft 80 for the roll 81, which gear 79 in turn meshes with and drives a gear carried by the perforater roll 82. All of these rolls are shown in normal position and as they are revolved by operation of the machine a ticket paper 83 is fed by the perforator blade 101, an electro 100 attached to the roll 72 and electros 98 and 99 attached to the roll 75, or, if one or more of the electros is removed, by feeding flanges (not shown) formed on the cylinders 72 and 75 and corresponding in length and elevation to the electros. To disable the ticket issuing mechanism one roll of each pair is moved away from its companion roll so that the electros and perforator will not grip and feed the ticket strip 83. For this reason, the teeth of the gears carried by said rolls are made long enough to prevent their being disengaged when the rolls are moved apart. The manner in which this separation of the rollers is accomplished will next be described.

Clamped to the shaft 53, which is rocked under the control of the special keys as above described, is an arm 831 with a pin 84 projecting into a slot in a bell crank lever 85 pivoted on a stub shaft 86 in the printer frame. Loosely attached to the upper end of the bell crank lever 85 is a link 87 (Fig. 4) attached at its other end to a bell crank lever indicated by the dotted outline 88, Fig. 6. This bell crank lever 88 carries a pin 91 engaging a slot in one end of another bell crank lever 92 which has a slot in its upper end surrounding a pin 93 in an arm 94 secured to the shaft 95 on which the perforator roller 82 rotates. The bell crank lever 87 is also rigidly attached to the shaft 96 upon which the electroroller 72 is rotatably mounted. The shafts 95, 96 and the shaft 53 each carries a pair of eccentrics 97 forming bearings for their respective rolls and normally positioned as shown in the drawing. A partial rotation of the shafts in question, so as to carry their eccentrics away from the opposing rolls 70, 75 and 80 will carry the rolls 76, 72 and 82 out of operating relation with the other rolls; that is, separate the rolls of each pair slightly, so that they can not feed the ticket paper 83. When the shaft 53 is rocked it moves first anti-clockwise, Fig. 4, and if this movement is traced through the arm 831 bell crank lever 85, the link 87 and the levers 88, 92 and arm 94, it will be seen that the shafts 95, 96 and 53 are simultaneously rocked in the proper direction to swing their eccentrics and the rollers carried thereon away from the opposing rollers far enough to prevent the perforator teeth and the electros from feeding the ticket paper 83.

The bell crank lever 85 carries an anti-friction roll 105 normally resting within the circle of a flange 106 on a disk secured to the shaft 69. When the shaft 53 is rocked anti-clockwise on a slip printing operation this roll is swung forward through an opening in the flange and rotation of the disk brings the flange in the path of the roll 105 and prevents the bell crank lever 85 from returning to its normal position after the mechanism has been started until the operation is practically completed. This flange also prevents rocking the shaft 53 after the machine has been started to record a transaction which does not call for the use of one of the special keys. At the end of an operation involving the rocking of the shaft 53 and parts just mentioned a spring 107 attached at one end to the pitman 48 and at the other to the machine frame, assisted by the spring 49, restores the shaft 53 and the mechanism operated by it to normal position.

The impressions taken from the item type carriers upon the tickets and slip are made by a platen 108, carried by a frame 109, pivoted to a pair of arms 110 swung from the shaft 111. One of these arms carries an anti-friction roller 112 (Fig. 7) engaging the race 113 of a cam 114 rotatably mounted on the shaft 53. A slot and pin connection (not shown) is provided between the cam 114 and the impression roll 76, so that when the shaft 97 is slightly rotated to cause the eccentrics on the shaft to carry the roll 76 away from the roll 75, the cam 114 is not affected, but when the roll is rotated by operation of the machine the cam is carried along. In other words, the center of rotation for the cam remains the same, no matter whether the roll 76 is in operative or idle position and the platen 108 has the same movement regardless of whether a ticket or a slip is printed. The race 113 of the cam is so formed that during a rotation of the shaft 53, the platen is raised twice to make two impressions on either the ticket or the slip for the transaction being registered. At the end nearest the machine proper the frame 109 carries a stud engaging the slot 115 in a guide plate 116 attached to the printer frame, so that when the platen is raised it is guided against the type carriers at the printing line 117.

When the devices carried by the rolls above mentioned feed the ticket paper 83, it passes through a slot in a stationary knife 118 and is severed by the movable knife 119 carried by a frame 120 which is at all times drawn toward the stationary knife by a torsion spring 121. The frame 120 is carried by a pair of arms 122 swung from the shaft 111 and one of these arms carries an anti-friction roller 123 Fig. 8 extending into the race of a cam 124 secured to the end of impression roller 76. The race of this knife cam as shown in Fig. 8 is so arranged that the knife is raised across the slot of the stationary knife and severs the ticket just before the end of the operation.

Figures 13, 14, 16:
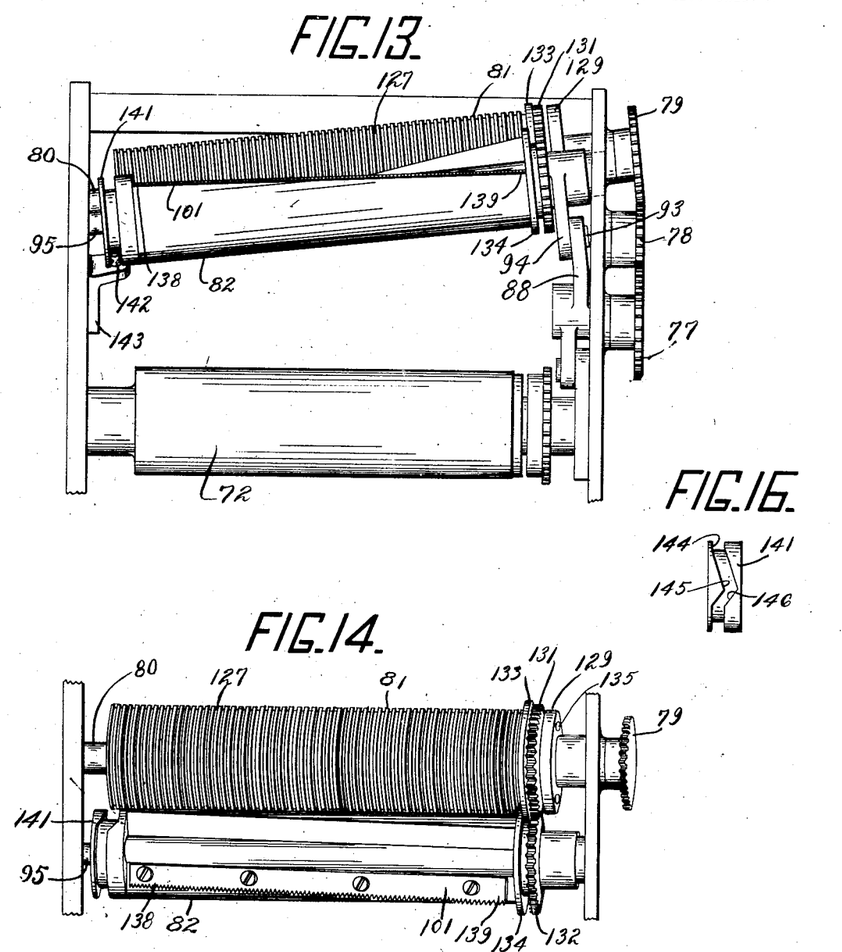
Fig. 13 is a rear view of the perforating devices and some of their driving connections.
Fig. 14 is a top view of the perforating devices.
Fig. 16 is a detail of a cam for shifting the perforator rollers.
Figure 15:
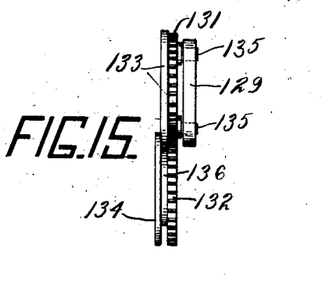
Fig. 15 is a detail of the gearing and connections of the perforator rollers.

The perforator mechanism is shown in detail in Figs. 13, 14, 15 and 16. It comprises the roller 82, carrying the perforator blade 101 and the roller 81 composed of steel or similar material and having annular grooves 127, corresponding to the teeth in the perforator. The shaft 80, upon which the roller 81 is loosely mounted, has secured thereto a gear 79 and a disk 129. Fastened to the roller 81 is a disk 133 and a gear 131. In order to allow the roller 81 to move laterally on its shaft, the roller 81 is driven through studs 135, secured to the gear 131, and projecting into holes in the disk 129. The perforator roll 82, loosely mounted on the shaft 95, has rigidly secured to it the disk 134, spacing collar 136 and the gear 132. The gear 131 meshes with the gear 132 and the disk 133 extends into the recess between the disk 134 and the gear 132, so that any lateral movement of one roller will be imparted to the other and the teeth of the perforator and the grooves of the roller 81 will always be held in alinement. Both the roller 81 and the roller 82 are set in the machine at an angle, as shown in Fig. 9 but parallel one to the other with the ticket paper 83 passing between them. The roller 82 is cut away, as shown in Figs. 6, 8, 13 and the perforator blade is attached to one of the sides of said cut. The cut is so made that the perforator blade when assembled in position is substantially spiral to the axis of the roller 82, but owing to the angle at which the roller is set, the line of the teeth is at right angles to the edges of the ticket paper. The line of the teeth also conforms to the curvature of the roller 82 and when the rollers are rotated, the teeth at the end 138, Fig. 13, are first brought into engagement with the paper and the other teeth are carried in successively until the ones at the end 139 have performed their work. By this arrangement of the blade, the teeth are not carried into contact with the paper simultaneously, but at the same time the line of perforation is at right angles to the length of the paper. However, owing to the angular position in the printer of the perforator rollers, the path of rotation of the teeth is not parallel to the length of the paper and the tendency would be, therefore, to pull the paper to one side while the perforator teeth are in engagement with it. To offset this, there is attached to the outer end of the roller 82, a cam 141 into the slot of which there extends an anti-friction roller 142 carried by a bracket 143 secured to the outside printer frame. At the instant that the teeth 138 of the perforator engage the ticket paper, the point 144, Fig. 16, of the cam slot strikes the roller 142 and the rollers 81 and 82 through the connection established by the disk 133 are both shifted laterally on their shafts 80 and 95, until the point 145 of the cam slot passes the roller, at which time the last tooth at the end 139 of the perforator passes out of engagement with the ticket paper. The surface 146 of the cam then shifts the rollers back to their normal position, in which position they remain during the rest of the rotation. The portion 144 to 145 of the cam slot is so graduated that during the time the teeth of the perforator are working their line of travel is parallel to the edges of the ticket strip instead of being as it is normally at right angles to the inclined shaft 95. This overcomes the tendency to pull the paper to one side and causes it to move continuously in the direction of its length, even while the perforator teeth are in engagement with it.

The perforator is placed at the proper distance from the rest of the ticket printing and issuing mechanism for its perforations to come between the impressions subsequently taken by the tickets from the item type carriers. The feeding of the paper is accomplished by the electros 100 and 98, which are of the same length and act during the same period of the operation of the machine, and the short electro 99. The perforator teeth also feed the paper slightly, but as this occurs while the electros 98 and 100 are acting no account need be taken of it. The electro 100 prints on the back of the ticket and the electros 98 and 99 on the face of the ticket, ink being supplied by the ink rolls 103. Three operations are required to complete a ticket and issue it from the machine. On the first operation, the perforator perforates the paper as it is pulled through by the electros attached to the rolls 72 and 75. On the next operation, the ticket perforated is printed on its back by the electro 100. On the next or third operation, the ticket is engaged by the electro 98 and the face of the main part of the ticket printed, after which the first impression is taken from the type at the printing line 117 of the item type carriers. The ticket is then engaged by the short electro 99 and fed forward a short distance, after which the second impression from the item type carriers is taken on the stub of the ticket and the ticket severed from the ticket strip. The ticket is then ejected from the machine by a separate feeding mechanism which will now be described.

After a ticket has been printed and severed from the ticket strip, it rests on a table 151, with its forward end under a knurled collar 152 loosely mounted on a rod secured at one end to the printer frame 153. (See Figs. 8 and 9.) A tongue 154 pivoted on this rod serves to hold the ticket or slip in position until removed by the operator. Spacing sleeves 155, 156 and 157 are provided to hold the parts just mentioned in their correct positions and a screw 158 in the end of the rod prevents movement of the parts away from the frame 153. Secured to the printer frame is a bracket 159. A short shaft 161 is rotatably supported at one end by this bracket and at the other end by the frame 153, with suitable spacing collars secured to it, to prevent its moving laterally in its bearings. Rigidly secured to this shaft is an arm 162 and attached to the opposite ends of a short shaft rotatably mounted in the rear end of this arm is a roller 164 composed of rubber or other suitable material and a pinion 165 (see Figs. 6, 8 and 9). Also fastened to the shaft 161 is an arm 166, normally held by the spring 167 against a stop pin 168. Attached to the opposite sides of the printer frame 153 are brackets 171 and 172 forming supports for a shaft 173 which is both rotatable and capable of movement in the direction of its length. This shaft carries a sleeve 174 secured to one end of which is a gear 175 and at the other a collar 176. This permits the gear and sleeve to rotate but prevents them from shifting laterally with the shaft. The gear 175 is at all times in mesh with the large intermediate gear 8 and is given a complete rotation every time the machine is operated. Secured to the shaft 173 is a disk 177 carrying a pin (not shown) extending through a hole in the gear 175. This pin is long enough to prevent its being drawn out of the hole in the gear regardless of the lateral position of the shaft and disk. Rigid together on a sleeve 178, loosely mounted on the shaft 173, is a cam 179 and a cam 180. An arm 181 (Fig. 4) secured to the shaft 173 carries a pin 182 projecting laterally into a hole 183 in the cam 180. As shown, the hole is considerably larger in diameter than the pin 182 so that, while the cams 179 and 180 are caused to rotate every time the shaft 173 is rotated, the cams have a limited movement independent of the driving arm 181. The arm 166 carries oppositely extending anti-friction rolls 184 and 185, cooperating with the cams 179 and 180 respectively. One or the other of these cams is at all times in operating relation with its anti-friction roll. In the normal or ticket issuing position of the parts, the cam 179 is in position to engage the anti-friction roll 184 and rotation of the cam forces the arm 166 forward against the tension of the spring 167, rocking the shaft 161, raising the feed roller 164 and pressing the ticket which is to be ejected against the knurled collar 152. The cams 179 and 180 perform their work just before the completion of an operation and their work must be done during a very few degrees of the rotation of the driving mechanism. The effectiveness of the cams is, therefore, prolonged a trifle, by providing each of them with an extension 186. This extension holds the arm 166 and feed roller 164 in the raised or feeding position for an instant after the shaft 173 comes to a stop and the independent movement of the cams permitted by the above mentioned slot and pin connection between the cams and the driving arm 181, allows the momentum of the cams, assisted by a slight camming action of the anti-friction rolls carried by the arm 166, to throw the cams up far enough to clear said anti-friction rolls and allow the arm 166 to return to its normal position. The cams then settle back to the positions in which they are shown in the drawings.

Meshing with the pinion 165, is a segment 187, loosely mounted on the shaft 161. A bell crank 188, pivoted at 189, has a slot 190 encompassing the shaft 161. Clamped in the slot of the segment 187 is an adjustable device 191 comprising a pin projecting into a slot 192 in the bell crank 188. A spring 193 fastened at one end to the machine frame and at the other to the bell crank 188, tends to swing the bell crank clockwise, but such movement is normally restrained by an anti-friction roll 194 carried by an extension of the bell crank 61 and resting in the path of the upper end of the bell crank 188. However, when the bell crank 61 is swung down by the pitman 62 to operate the record strip platen 60, the roller 194 is lowered so that the spring 193 can swing its bell crank and, through the adjustable connection above described between the bell crank 188 and the segment 187, the segment is swung upward. This occurs at about the time the arm 162 is swung up to raise the feed roll 164 and the pinion 165, but usually the segment 187 travels through a slightly greater arc than does the arm 162. When the bell crank 61 is returned to normal position to restore the platen 60 the anti-friction roll 194 engages the camming edge 195 of the bell crank lever 188 and restores the lever to its normal position. This throws the segment 187 down and drives the pinion 165 and the roller 164 in an anti-clockwise direction so that the ticket which is at the time gripped between the roll and the knurled collar 152 is ejected from the machine. The anti-friction roll 184 then trips off of its cam 179, allowing the spring 167 to return the arms 162 and 166 to their normal positions.

On a slip printing transaction the slip is inserted so that it rests on the table 151 and under guide 196 and the tongue 154, with the line where the printing is to be done under the printing line of the item type carriers. After the first impression is made on the slip, the feed roller 164 is raised and driven to feed the slip the proper distance for it to receive the second impression, at the point desired. However, raising the feed roller to effective position and then driving it involves the operation of some elements not involved in the ticket ejecting operation. The roller is raised by the cam 180, while the bell crank lever 188 is swung in one direction by a cam 201 acting against the anti-friction roller 202 secured to said lever and in the other direction by a cam 203 acting against a shoulder 204 near the upper end of the lever. Both of these cams are rigidly attached to the shaft 173. In the normal position of the parts, as shown in Fig. 9, all three of these cams, that is 180, 201 and 203, are out of alinement with the elements that they are designed to engage, but are moved into alinement by the operation of the mechanism for disabling the ticket mechanism. Loosely mounted on the shaft 173 is a yoke 205 in which is fastened a stud 206 projecting through a cam slot 207 cut in the bracket 172. A link 208 connects an arm integral with the yoke to the upper end of the bell crank lever 85. When the shaft 53 is rocked and the upper end of the lever 85 thrown toward the front of the machine, the link 208 pushes the yoke forward and down. The stud 206 of the yoke is guided by the slot 207 in such a way that the yoke is shifted to the left carrying with it the shaft 173 and all of the parts supported by said shaft with the exception of the gear 175 and its sleeve. In order to allow room for the shaft 173 to shift, the gear 175 is cut out to receive the disk 177 when it is carried in the direction of the gear. This moves the cam 179 out of alinement with the roller 184 and carries cam 180 into alinement with the roller 185. The cams 201 and 203 are also brought into alinement with the parts of the bell crank lever 188 which they are to respectively engage. Rotation of the shaft 173 in this shifted position causes the cam 180 to raise the feed roller 164 into position to coöperate with the knurled collar 152 in the same manner as above explained in describing a ticket ejecting operation. However, owing to the construction of the parts for driving the feed roller on slip printing operations, the roller must be held in a raised position longer than is necessary on check ejecting operations. For this reason the cam 180 has a longer effective surface than the cam 179. Toward the latter part of the operation of the machine, or after the bell crank 61 is lowered to carry the roll 194 out of the road, the cam 203 engages the shoulder 204 on the bell crank 188 and swings the bell crank clockwise on its pivot. This raises the anti-friction roller 202 into the cut away portion 211 of the cam 201 which has been carried by the rotation of the shaft into a position where this cut away portion is opposite said roller. This movement of the lever through the adjustable slot and pin connection between the two, raises the segment 187 to effective position. When the surface 212 of the cam 201 engages the roller 202 the lever 188 is swung back to normal position and the segment 187 carried down, thereby rotating the roll 164 and feeding the slip to the proper position to receive the second printing, after which it can be removed from the table 151. The springs 49 and 107 then rock the shaft 53 back to its original position and through the bell crank 85 and link 208 restores the yoke 205 to its starting point, with the stud 206 at the top of the cam slot 207. This shifts the shaft 173 and the parts shifting with it back to the ticket ejecting position.

The adjustable device 191 is provided to permit changing the distance that the segment 187 is carried by an operation of the machine. By moving the adjustment toward or away from the shaft 161 a shorter or longer feed for either the tickets or the slips is made possible.

The user of such a machine might desire for some reason or other to discontinue ejecting tickets and use the printing mechanism only to print on inserted slips when handling special transactions. To accomplish this, there is provided the usual sleeve 213 arranged so that it can be merely rotated to rock the shaft 53 to the position where the ticket issuing mechanism is disabled and the slip feeding devices rendered effective. Suitable means are provided to hold the sleeve in either the normal or the slip printing position. When it has been rotated to rock the shaft to the slip printing position the yoke 205 is held in its shifted position with the cams 180, 201 and 203 in operative relation to the elements that they are intended to engage.

In order to have a permanent record of the transactions on which slips are issued, there is provided a type carrier 214 arranged to be moved into position to print on the record strip, whenever the slip mechanism is operated. This type carrier is pivoted on the hub of the adjacent amount printing type carrier 39. Secured to a short rock shaft 215 (Figs. 4 and 5) extending through the printer frame is an arm 216 having a ball and socket connection with the type carrier 214. At the opposite end of this short rock shaft is fastened an arm 217 pivotally attached to an extension of the bell crank 85. It will readily be seen that when the bell crank 85 is rocked on a slip printing operation the type carrier 214 will be swung on its pivot to bring its printing type to the printing line 218 where it is held until the bell crank 85 is shifted at the end of the registration.

Figures 2, 3:
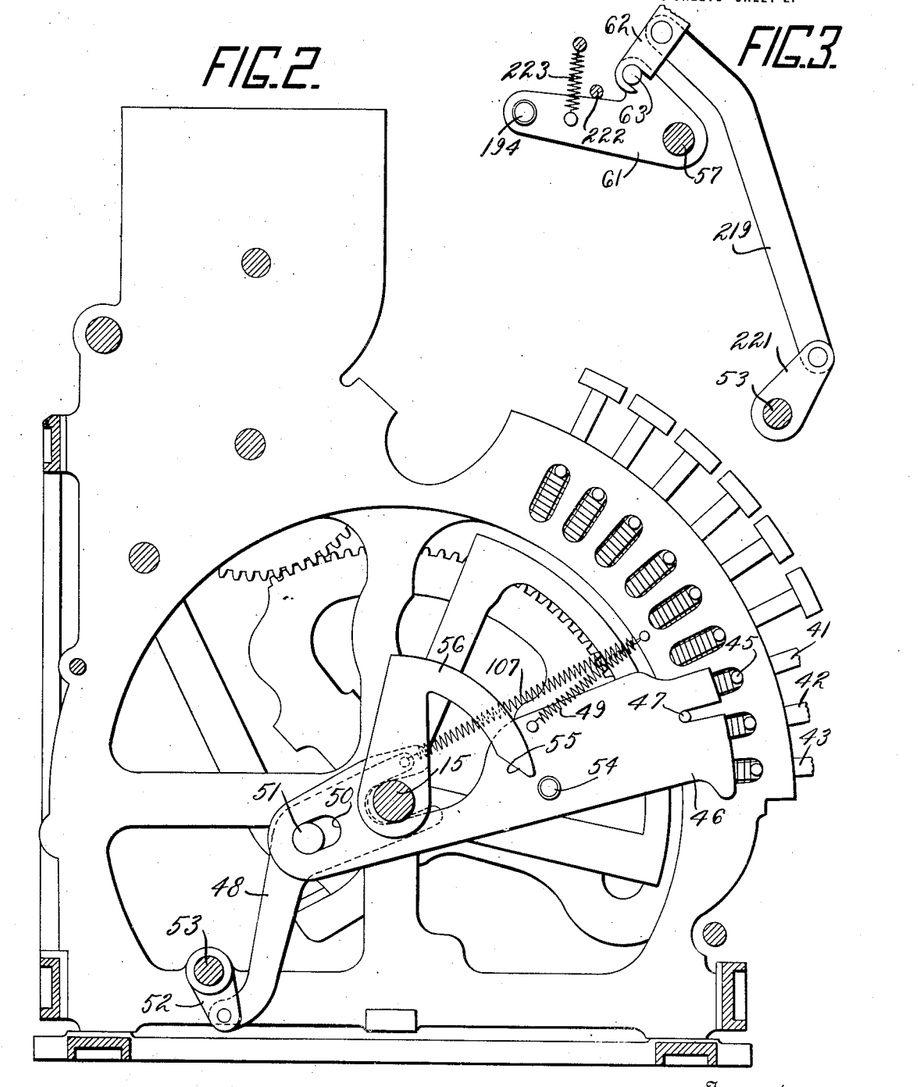
Fig. 2 is a vertical section showing part of the printer controlling mechanism.
Fig. 3 is a detail showing a device whereby disabling the ticket printer will also disable the record strip printing mechanism.

In Fig. 3 there is shown mechanism which may be used for disconnecting the pitman 62 from the bell crank 61, thereby disabling the record strip platen on slip printing operations. The lower end of the pitman 62 has a hook engaging the stud 63. A link 219 connects the lower end of the pitman 62 to an arm 221 rigid on the rock shaft 53. When said shaft is rocked, either under control of the special keys 41, 42 and 43, or by means of the sleeve 213, the link 219 will swing the pitman 62 so as to disengage its hook from the stud 63. Then when the pitman 62 is reciprocated by the cam 631 the bell crank 51 and the platen 60 will not be affected, but will normally be held against the stop pin 222 by a spring 223. The cam face 195 of the bell crank lever 188 acting against the roller 194 will impart a rocking movement to the bell crank 61 but this movement is not quite sufficient to press the platen 60 against the type carriers. In machines where this construction is used the type carrier 214 and its operating mechanism are, of course, omitted, as there is no object in providing such a device when no entry of any kind is made on the record strip of the transactions for which the slip is printed.

As indicated in the foregoing, type carriers are provided for printing the consecutive numbers of transactions on the record strip, the tickets and the inserted slips; also type carriers for printing the date on the ticket and slip. The consecutive numbering wheels 224 are rotatably mounted on a sleeve 226 which is arranged to turn on the shaft 37, Figs. 11 and 12. A yoke 227 swung at one side on the hub of the adjoining amount printing wheel and at the other on the tube 226 carries a five-pronged pawl 228. This numbering device is of the ordinary deep notch type, and the teeth of these prongs are staggered so as to engage the ratchets attached to the number wheels and operate them in the usual way. Rotating about the printer wheel tubes 38 is a collar 231 carrying an arm 232 to which the yoke 227 is connected by a bracket 233. Rigid with the collar 231 is an arm 234, which carries a pin engaging a slot in a bell crank 235 pivoted at 236 to the machine frame. The upper end of this bell crank has an open slot spanning the stub shaft 74 and carries an anti-friction roller 237 projecting into the groove of a cam 238 rigid with the gear 73, Fig. 6. The configuration of this cam groove is such that on every operation of the machine, regardless of the nature of the transaction, the bell crank 235 is rocked, first clockwise and then anti-clockwise. This movement is transmitted, through the connections described, to the yoke 227, first lowering the yoke far enough for one or more of the prongs of the pawl 228 to engage the ratchets of the numbering wheels, then returning it to its original position and carrying the type wheels one division, where they are retained by the spring pressed retaining pawls 241. The sleeve 226 is larger in diameter at the part supporting the number wheels than it is at other points and carries two square sided longitudinal grooves 242, adapted to engage the square shoulder of spring pressed pawls 243, which are attached to the ratchets 229 and operate in suitable openings in the type carrying disks. At its outer end the sleeve 226 is provided with a cut to receive a tongue on the end of a sleeve 244 rigidly secured to a knurled cap 245. This cap has two slots 246, one or the other of which engages a pin 247 in an extension of the bushing extending through the frame 248. When it is desired to reset the consecutive number to zero, this cap 245 is drawn out far enough to disengage the cut 246 from the pin 247. This allows the cap 245 to be rotated but the tongue on its inner end is still in engagement with the corresponding cut in the sleeve 226. The cap 245 is then turned so that the sleeve 226 is rotated anti-clockwise, Fig. 12, and the square shoulders 242 of the longitudinal grooves in the sleeve engage the shoulders on the pawls 243 and the consecutive number type carriers are carried toward the zero position. By pushing in on the cap 245 as it is rotated, one or the other of slots 246 will engage the pin 247 and stop the rotation of the cap, at which time the consecutive number wheels will have been carried to the normal zero position.

Figures 10, 11, 12:
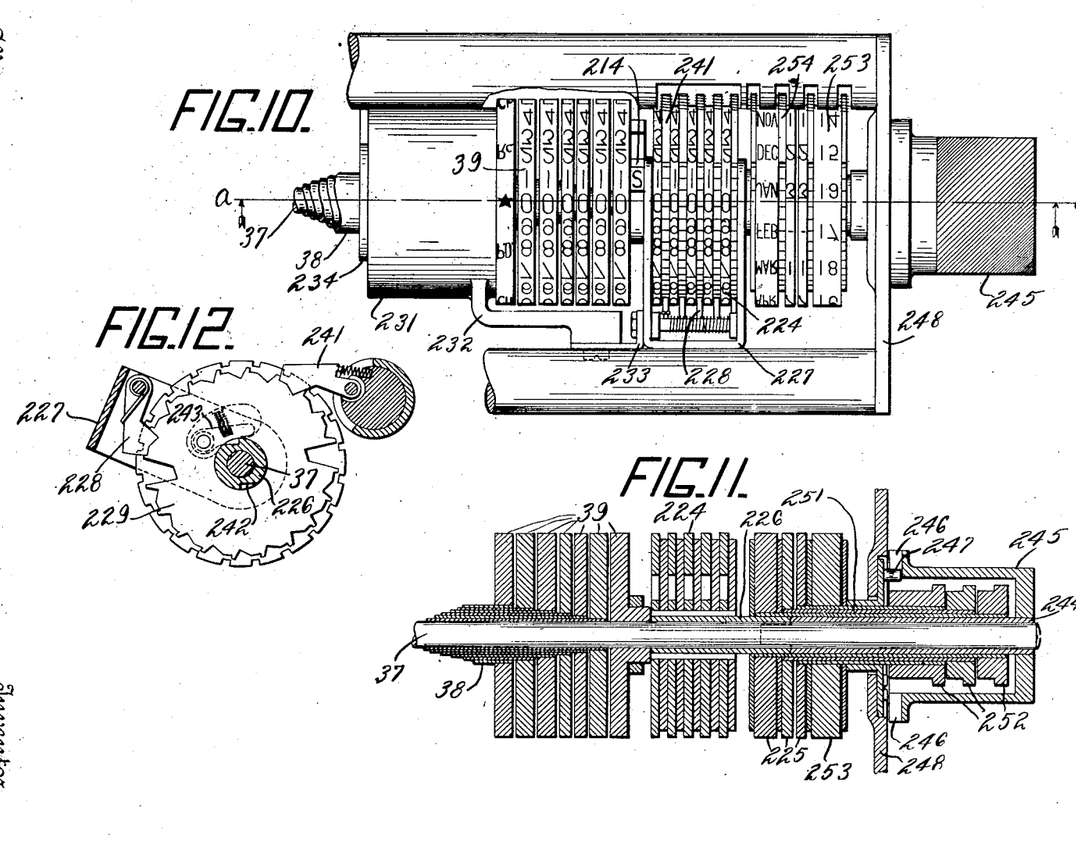
Fig. 10 is a top plan of the type carriers for printing data regarding items entered in the machine.
Fig. 11 is a vertical section on the line A—A Fig. 10.
Fig. 12 is a detail of the consecutive numbering mechanism.

The three wheels 225 for printing the month and date of the month are rigid on concentric sleeves 251 rotating about the sleeves 226 and 244 and carrying at their outer ends knurled collars or knobs 252 by which the wheels may be independently rotated to set up their type. The year printing wheel 253 rotates about the outer one of the tubes 251. No sleeve or setting knob is provided for it, as it is moved but once a year and is then manually rotated to bring the correct type into printing position. The date wheels have attached to their sides suitable ratchets with which spring pressed lining pawls 254 coöperate to hold the wheels in the position to which they have been set. As shown in Fig. 11, the date changing knobs 252 are inclosed by the cap 245, but the cap and its sleeve 244 can be drawn out far enough to gives access to the knobs. This arrangement is very convenient, as in preparing the type carriers for the day's business, the cap 245 is drawn out far enough to permit operation of the date changing knobs, after which the cap can be pushed in until the tongue on the inner end of the tube 244 is in engagement with the corresponding cut in the consecutive number resetting sleeve 226, but not so far that the stud 247 will prevent rotation of the cap. The cap is then turned and at the same time pressed toward its normal position, so that when the number wheels are brought to their zero positions, one or the other of the slots 246 will engage the stud 247 and bring the cap to a stop.

The foregoing description is thought to be clear, but in order to aid in reaching a thorough understanding of the improvements a brief statement will next be given of what occurs, first on a ticket issuing operation and then on a slip printing operation.

The ticket printing and ejecting mechanisms are normally in effective position and to issue a ticket the proper keys to represent the item to be registered are pressed and the handle turned. The tickets are drawn from a continuous strip of ticket paper which is perforated at equal intervals by perforator teeth carried by the obliquely placed perforator roll. The design and arrangement of the parts are such that the teeth of the perforator blade are carried into engagement one after the other but perforate the paper in a straight line at right angles to the edge of the strip. In order to prevent the perforator teeth from interfering with the rectilinear movement of the paper, the perforating devices are shifted longitudinally while the teeth are in engagement. After the ticket has been fully printed and severed from the ticket strip, it is seized by the independent feeding mechanism and quickly fed out of the printer to a position where it can be readily grasped by the operator. On a slip printing transaction, one of the keys that must be depressed in properly setting up the item on the key board preparatory to entry in the machine controls mechanism which disables the ticket printing mechanism, and changes the time of the operation of the independent feeding mechanism so that the slip is fed between the two impressions taken thereon from the item type carriers. In order to accomplish this, the shaft which carries the operating devices for the feeding mechanism is automatically shifted longitudinally so as to render ineffective the parts operating the feeding mechanism on the ticket issuing transactions and move the feed operating devices for the slip printing operations into effective position. At the completion of the registration the ticket printing mechanism and the independent feeding mechanism return to their normal ticket issuing positions.

While the form of mechanism herein shown and described is admirably adapted to fulfil the objects primarily stated, it is to be understood that it is not intended to confine the invention to the one form of embodiment herein shown and described, as it is susceptible of embodiment in various forms, all coming within the scope of the claims which follow.

What is claimed is:—

1. In a machine of the class described, the combination with a recording device in which items of different classes may be entered, paper feeding devices, a means for operating said feeding devices when items of one class are entered in the recording device, separate means for operating said feeding devices when items of other classes are entered in the recording device, and manipulatively controlled means for predetermining which of said operating means is to be effective when an item is entered in the recording device.

2. In a machine of the class described, the combination with a recording device in which items are entered according to a predetermined classification, of manipulative means for classifying said entries, paper feeding devices, a means for operating said feeding devices when items of one class are entered in the recording device, a separate means for operating said feeding devices when items of other classes are entered in the recording device and means controlled by the aforesaid manipulative means for predetermining which of said operating means is to be effective.

3. In a machine of the class described, the combination with an accounting device in which items may be entered according to a predetermined classification, manipulative means for classifying the entries, paper feeding devices, means for actuating said feeding devices when transactions of one class are entered in the aforesaid accounting device, independent means for actuating said feeding devices when transactions of other classes are entered in the accounting device, and means whereby operation of the aforesaid manipulative means will render the proper actuating means effective.

4. In a machine of the class described, the combination with an accounting device, of paper feeding devices normally in ineffective position, means for rendering said feeding devices effective, means for actuating said feeding devices when transactions of a certain class are entered in the aforesaid accounting device, separate means for actuating said feeding devices when transactions of other classes are entered in the accounting device, and manipulative means for selecting the desired actuating means.

5. In a machine of the class described, the combination with an accounting device, of paper feeding devices normally in ineffective position, devices for moving said feeding devices into effective position, means for driving said feeding devices, means for actuating said driving devices when transactions of a certain class are entered in the aforesaid accounting device, and a separate means for actuating said driving devices when transactions of other classes are entered in the accounting device.

6. In a machine of the class described, the combination with driving devices having an invariable extent of movement, of normally ineffective paper feeding devices, an element for rendering said feeding devices effective during a certain proportion of the movement of the driving devices, a second element for rendering said feeding devices effective during a different proportion of the movement of the driving devices, and manipulative means for determining which element is to be effective on an operation of said driving devices.

7. In a machine of the class described, the combination of normally ineffective paper feeding devices, means for rendering said feeding devices effective, means for operating the feeding devices to feed a certain distance, and a separate means for driving the feeding devices to feed a different distance.

8. In a machine of the class described, the combination of paper feeding devices, means for normally operating said devices to feed a certain distance, independent means for operating said devices to feed a different distance, and manipulative means for rendering said last mentioned operating means effective.

9. In a machine of the class described, the combination of a normally ineffective paper feeding roller, an invariably moved element, a pair of cams for rendering said feeding roller effective carried by said invariably moved element, and manipulative means for predetermining which of said cams is to be effective when the invariably moved element is actuated.

10. In a machine of the class described, the combination with a main operative mechanism, of paper feeding devices, independent means for driving said feeding devices, one of which is normally effective, manipulative means operable to render the other means effective on a single subsequent operation, and a separate manipulative means operable to hold said second means in effective position regardless of operation of the first mentioned manipulative device.

11. In a machine of the class described, the combination with a main operating mechanism, of paper feeding devices, independent means for driving said feeding devices, one of which is normally effective, and adjustable means holding the other driving device in effective position on successive operations of the main operating mechanism.

12. In a machine of the class described, the combination with a main operating mechanism, of paper feeding devices, independent means for driving said feeding devices, one of which is normally effective, and manipulative means operative at will for rendering said normally effective device ineffective and the other effective.

13. In a machine of the class described, the combination with a main operating mechanism of paper feeding devices, independent means for driving said feeding devices, manipulative means for predetermining which of said driving means is to be effective on an operation of the main operating mechanism, and a separate manipulative means for holding one of said driving devices in effective position on all operations of the main operating mechanism regardless of operations of the first mentioned manipulative means.

14. In a machine of the class described, the combination of paper feeding devices, a means for operating said devices to feed the paper a certain distance, an independent means for operating said devices to feed a different distance, and an adjustable device for changing the length of the feed by either of said means.

15. In a machine of the class described, the combination of paper feeding devices comprising a roller, driving devices for said roller, a means for actuating the driving device to rotate the roller a certain extent, an independent means for actuating the driving device to rotate the roller a different extent, and an adjustment for regulating the extent of the rotative movement of the roller when operated by either of said means.

16. In a machine of the class described, the combination with paper feeding devices normally in ineffective condition, means for rendering said devices effective for different durations, variably operable means for driving the feeding devices the entire time they are in effective condition regardless of the duration of said condition, and means for effecting variable operation of the driving means.

17. In a machine of the class described, the combination with paper feeding devices normally in ineffective condition, manipulative devices, and mechanism controlled by the manipulative devices for rendering the feeding devices effective for different durations and driving same the entire time they are in effective condition regardless of the duration of said condition.

18. In a machine of the class described, the combination with a paper feeding roller normally in ineffective position, manipulative devices, means controlled by the manipulative devices for moving the feeding roller to effective position and holding it in that position for different durations, variably operable means for driving the feeding roller the entire time it is in effective position regardless of the duration, and means also controlled by the manipulative devices for effecting variable operation of the driving means.

In testimony whereof I affix my signature in the presence of two witnesses.

EDWARD J. VON PEIN.

Witnesses:
  R. C. GLASS,
  CARL BEUST.